Figure 1:
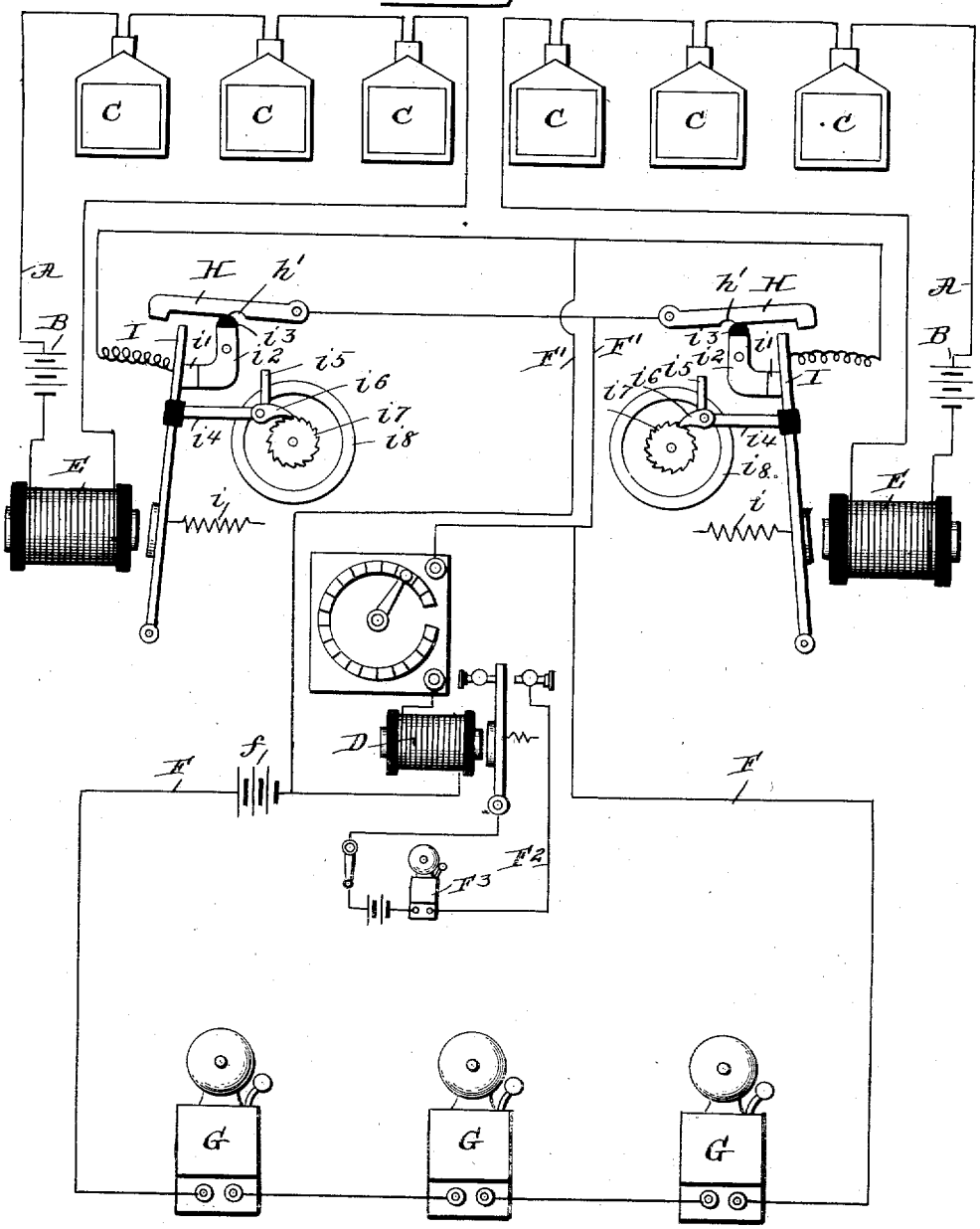

No. 11,678. Reissued July 12, 1898.

L. G. ROWAND.

ELECTRIC SIGNALING MECHANISM.

(Application filed Dec. 15, 1897.)

2 Sheets—Sheet 1.

Witnesses.

Jesse B. Heller,

Frances Ellis.

Inventor.

Lewis G. Rowand by G. F. Harding

Attorney.

No. 11,678. Reissued July 12, 1898.

L. G. ROWAND.

ELECTRIC SIGNALING MECHANISM.

(Application filed Dec. 15, 1897.)

2 Sheets—Sheet 2.

Witnesses.

Jesse B. Heller.

Frances Ellis

Inventor.

Lewis G. Rowand per G. F. Harding

Attorney.

UNITED STATES PATENT OFFICE.

LEWIS G. ROWAND, OF CAMDEN, NEW JERSEY.

ELECTRIC SIGNALING MECHANISM.

SPECIFICATION forming part of Reissued Letters Patent No. 11,678, dated July 12, 1898.

Original No. 593,692, dated November 16, 1897. Application for reissue filed December 15, 1897. Serial No. 662,075.

*To all whom it may concern:*

Be it known that I, LEWIS G. ROWAND, a citizen of the United States, residing at Camden, county of Camden, and State of New Jersey, have invented a new and useful Improvement in Electric Signaling Mechanism, of which the following is a full, clear, and exact description, reference being had to the accompanying drawings, which form a part of this specification.

In electric signaling apparatus—for instance, fire-alarm signaling apparatus—the signal given by a box on the main circuit is transmitted to the signal in the main station and from there transmitted to the various fire-houses. The object of my invention is to make this transmission or repeating of a signal on the main line to branch lines automatically with certainty and to allow sufficient time to enable the signals to be transmitted clearly, and, further, to provide a construction which will enable the translating devices on the branch lines to be in closed circuits and yet not acted on until dictated by the signal given on the main line. I accomplish the first of these by placing in the main circuit in the central station an electromagnet the core of which controls a switch device of the secondary circuit, which latter circuit includes the signals in the various fire-houses. Further, as the action is very rapid, if the switch acted to close the secondary circuit under the influence of the magnet, I cause the circuit to close in the return movement of the switch under the action of the mechanical device which normally holds it in its retracted position. I further provide means to retard the return movement of this switch, and thus make its operation slower, its closure longer, and its action more certain.

I accomplish that object of my invention which consists in providing a construction of circuits which will enable the translating devices to be in a closed circuit and yet not acted on until dictated by the signal given on the main line by placing the translating devices on the secondary circuit in closed circuit, and upon the same circuit I place an electromagnet of high resistance which will prevent the current of that circuit acting upon the translating devices. I provide an open shunt-circuit around or about this magnet, there being upon that open shunt-circuit a switch controlled by an electromagnet on the main-line circuit, and in order to provide for a test of this secondary circuit and its battery I have a short circuit with a signal in the central station and provided with a switch controlled by the electromagnet on the secondary circuit, so that when said magnet is energized it holds the switch open, and when for any cause the secondary circuit becomes deranged its magnet is disenergized and the switch operated to close the circuit.

I will now describe the embodiment of my invention as illustrated in the accompanying drawings and then point out the invention in the claims.

In the drawings, Figure 1 is a view showing two fire-alarm circuits provided with boxes and the signal, the main station, the secondary circuit, with its signals, and the switch device controlled by the electromagnets in the main circuit. Figs. 2, 3, 4, 5, 6, and 7 show various forms of switch devices for operating the secondary circuit.

A represents the fire-alarm circuits, having the batteries B and make-and-break boxes C C.

E are electromagnets on the circuits A within the central station.

F is an independent circuit having battery *f* and extending from the central station to the various fire-houses and provided at the desired points with the signals G. Upon the circuit F is an electromagnet D of high resistance, which normally prevents the current affecting the signals G.

F′ is a shunt-circuit about the magnet D. This shunt is normally open and is closed by a switch under the control of the magnet E on the main circuit A, various forms of which switch and method of operation are shown in the various figures.

$F^2$ is a circuit having the signal $F^3$, which is controlled by the armature of the magnet D.

In Fig. 1 the wire of the circuit F′ is connected to the pivoted arm H and also to the pivoted arm I. This arm I is secured to or forms part of the armature of the magnet E. *i* is a spring holding the arm away from the magnet when the magnet is not energized. Connected to the arm I is the projection $i'$, and $i^2$ is a pivoted arm having the insulated portion $i^3$, the arm H having the cut-away portion $h'$. Also connected to the arm I is the arm $i^4$, having projection $i^5$ and pivoted pawl $i^6$ working on the ratchet $i^7$ of the balance-wheel $i^8$.

Taking the devices as shown in Fig. 1, the magnet E, being energized, draws the arm I toward it, and the projection $i^5$ strikes arm $i^2$, so as to cause the insulated portion $i^3$ to fall into the cut-away portion $h'$, which allows the arm H to fall, so that its projecting end is in alinement with the end of the arm I, the arm I being, however, in that position beyond said arm H. Now when the circuit A is broken the spring $i$ moves the arm I away from the magnet, causing the end of the arm I to strike the end of the arm H, lifting the arm H and bringing it into the position shown in Fig. 1. During the time which the arm I is in contact with the arm H the circuit F′ is completed and the circuit to the signals G made independent of the magnet D. The movement of the pawl over the ratchet causes the movement of the arm I under the action of the spring $i$ to be retarded, and thus contact between the arm I and the arm H maintained for a longer period.

In the following forms I have connected the circuit F direct to the signals instead of the shunt-circuit F′.

Figure 2:
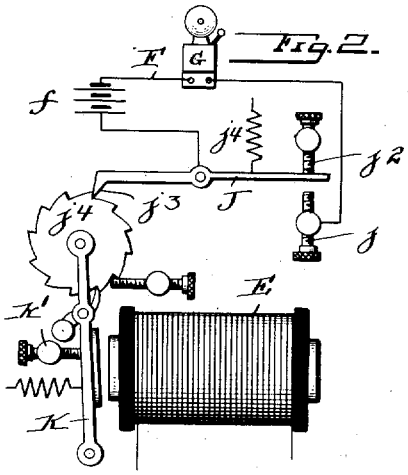

In the form shown in Fig. 2 the switch mechanism for making and breaking the circuit F consists of the following: an arm J, centrally pivoted. To this arm is connected the wire of the circuit F, the wire also being connected to the binding-post $j$ in line with the end of the arm J in its movement in one direction, and $j^2$ is a stop in line with the same end of the arm J in its movement in the other direction. The opposite end of the arm has projection $j^3$, which rests in the notches in the roller $J^4$. A spring $j^4$ holds the projection $j^3$ of arm J against the roller. Upon the shaft of this roller is connected the pivoted arm K, which forms or is connected with the armature. A spring $k$ keeps the arm K in its retracted position when the magnet is not energized, and the stop $k'$ limits its movement in that direction. When the magnet E is energized, the movements of the arm K and roller $j^4$ do not move the arm J, the roller merely revolving; but when the magnet is disenergized and the arm by the action of the spring is moved toward stop $k'$ the movement of the roller lifts the arm out of the notch, causing it at its other end to contact with $j$, and thus close the circuit F.

Figure 3:
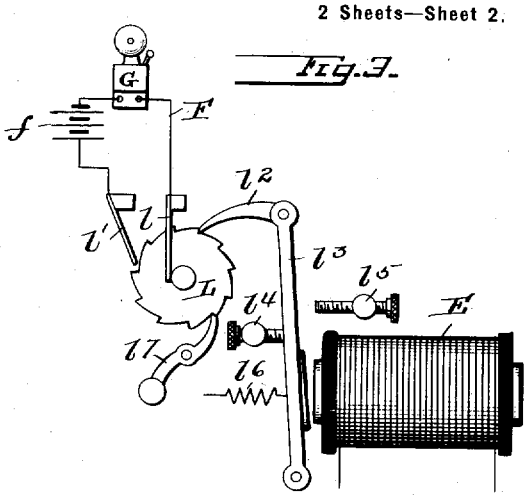

In Fig. 3 the circuit F is completed through a notched roller L and two arms $l$ $l'$, contacting, one arm, $l$, being always in contact with the roller L, the other, $l'$, being in such position as to be struck by the crown of the notches of wheel L, but to be without the route of said notches. $l^2$ is a pawl connected with the armature $l^3$ of magnet E, said armature having the stops $l^4$ $l^5$ to limit its movement, the spring $l^6$ to hold it and move it away from the magnet; and $l^7$ is a holding dog or pawl for the roller L. When the magnet is energized, the pawl $l^2$ moves over the teeth of roller L; but when the arm is moved by the spring $l^6$ the roller is moved so that the arms $l$ $l'$ contact with the roller, and the circuit F is completed.

Figure 4:
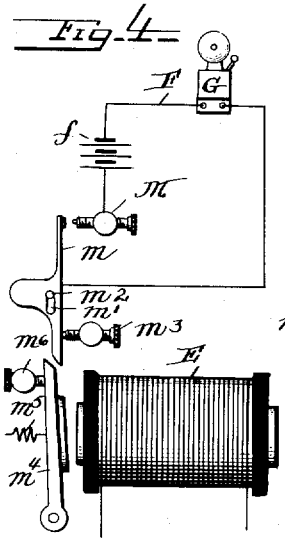

In Fig. 4 the current F passes through the binding-post M and the plate $m$, which normally rests out of contact with binding-post M. The plate $m$ has the vertical slot $m'$, in which the pin or stud $m^2$ rests. In line with the lower end of the plate $m$ is placed the stop $m^3$. The lower end of plate $m$ is beveled or inclined toward magnet E. The armature $m^4$ of the magnet E is pivotally provided with spring $m^5$ and has in alinement with it the stop $m^6$. When the magnet is energized, the armature in its movement lifts the plate $m$ vertically through the pin-and-slot connection of the plate without causing the plate to contact with the binding-post M. When the armature $m^4$ moves in the opposite direction, striking the straight face of the plate $m$ causes it (the plate) to turn on the pin and contact with binding-post M, thus completing circuit F.

Figure 5:
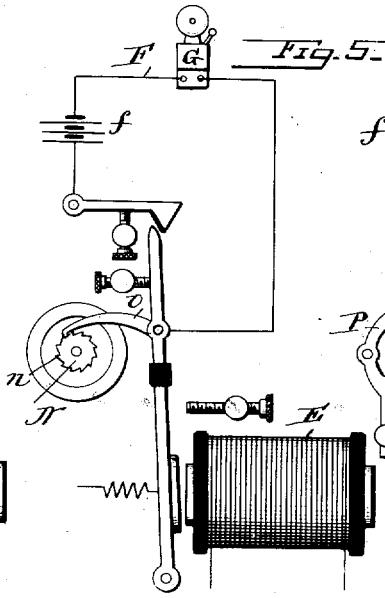
Figure 7:
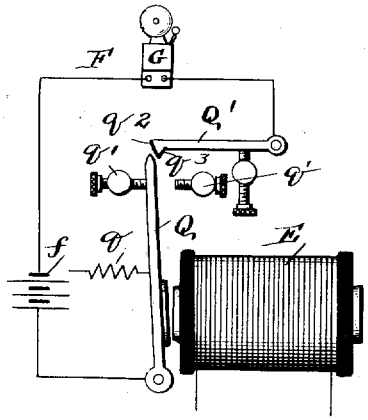

In Fig. 5 the construction is substantially like that of Fig. 7, except the armature has connected with it a pawl O, which works in the notches $n$ of a ratchet-wheel N. In the movement of the armature toward the magnet the pawl slips over the notches; but in its movement in the other direction the pawl moves the wheel and to that extent retards the movement.

Figure 6:
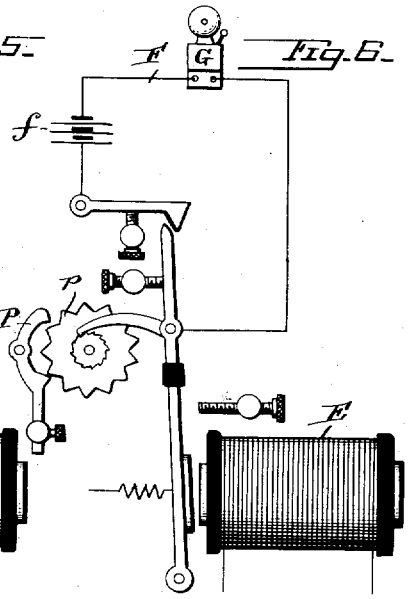

The construction shown in Fig. 6 is substantially like that shown in Fig. 1 as modified in Fig. 5, except instead of a notched roller an escapement P, having a notched hub or barrel $p$, is used. In the movement of the armature-arm from the magnet this escapement acts to retard the movement of the arm.

In Fig. 7 the circuit F is connected with the armature Q of magnet E. $q$ is a spring for returning the armature Q when the magnet E is demagnetized. $q'$ $q'$ are stops limiting the movement of the armature Q. Q′ is a pivoted arm to which the circuit F is also connected. When these two arms Q and Q′ are electrically connected, the circuit is complete. The face $q^2$ is insulated, while face $q^3$ of the arm Q′ is active, so that when the magnet is energized and the arm Q passes over the face $q^2$ the circuit is not completed; but when the magnet is deënergized and the spring $q$ returns the arm Q in the other direction and contact is made between said arm and the face $q^3$ the circuit is completed.

Having now fully described my invention, what I claim, and desire to protect by Letters Patent, is—

1. In combination, a main circuit, signaling devices on said circuit, a second circuit, receiving devices on said circuit, an electric device on said main circuit, a switch device consisting of two members, controlling said second circuit, the first member of which is moved in one direction by said electric device when energized, and means to return said member to its initial position when said electric device is deënergized, and a device adapted to hold said second switch member out of electric connection with said first switch member in its movement under the action of the electric device.

2. In combination, a main circuit, signaling devices on said circuit, a second circuit, receiving devices on said circuit, an electric device on said main circuit, a switch device consisting of two members, controlling said second circuit, the first member of which is moved in one direction, by said electric device when energized, and means to return said member to its initial position when said electric device is deënergized, and a device adapted to hold said second switch member out of electric connection with said first switch member in its movement under the action of the electric device, and means to retard the return movement of said first switch member when said electric device is deënergized.

3. In combination, a main circuit, signaling devices on said circuit, a second circuit, receiving devices upon said circuit, an electromagnet upon said main circuit, said magnet having a pivoted armature, means to hold the armature of said magnet in its retracted position and move it toward that position when the main-line circuit is broken, the second circuit including the said armature, and a pivoted arm in alinement with the armature, the armature being free from said arm at its extreme position in either direction, the armature in its movement under the influence of the retractile device making electrical connection with said pivoted arm.

4. In combination, a main circuit, signaling devices on said circuit, a second circuit, receiving devices upon said circuit, an electromagnet upon said main circuit, said magnet having a pivoted armature, means to hold the armature of said magnet in its retracted position and move it toward that position when the main-line circuit is broken, the second circuit including the said armature and the pivoted arm in alinement with the armature, the armature being free from said arm at its extreme position in either direction, the armature in its movement under the influence of the retractile device making electrical connection with said pivoted arm, and a retarding device connected with the armature and acting during the movement of the armature under the action of the retractile device.

5. In combination, a main circuit, signaling devices upon said circuit, an electric device on said main circuit, a second circuit, receiving devices on said circuit, an electromagnet of high resistance on said second circuit, the circuit through the magnet being normally closed, a shunt about said magnet, said shunt being normally open, a switch device, consisting of two members controlling said shunt, the first member of which is moved in one direction by said electric device on the main circuit when said electric device is energized, and means to return said member to its initial position when said electric device is deënergized, and a device adapted to hold said second switch member out of electric connection with said first switch member in its movement under the action of the electric device, and a third circuit containing an indicating device, a switch controlling said circuit, said switch being controlled by the electromagnet of high resistance, and adapted to be held open when said magnet is energized.

6. In combination, a main circuit, signaling devices upon said circuit, an electric device on said main circuit, a second circuit, receiving devices on said circuit, an electromagnet of high resistance in said second circuit, the circuit through the magnet being normally closed, a shunt about said magnet, said shunt being normally open, a switch device consisting of two members controlling said shunt, the first member of which is moved in one direction by said electric device on the main circuit when said electric device is energized, and means to return said member to its initial position when said electric device is deënergized, and a device adapted to hold said second switch member out of electric connection with said first switch member in its movement under the action of the electric device, and means to retard the return movement of said first switch member when said electric device is deënergized, and a third circuit containing an indicating device, a switch controlling said circuit, said switch being controlled by the electromagnet of high resistance, and adapted to be held open when said magnet is energized.

7. In combination, a main circuit, signaling devices upon said circuit, an electric device on said main circuit, a second circuit, receiving devices on said circuit, an electromagnet of high resistance in said second circuit, the circuit through the magnet being normally closed, a shunt about said magnet, said shunt being normally open, a switch device controlling said shunt controlled by said electric device on the main circuit, and a third circuit containing an indicating device, a switch controlling said circuit, said switch being controlled by the electromagnet of high resistance and adapted to be held open when said magnet is energized.

8. In combination, a main-line circuit, signaling devices on said circuit, an electric device on said circuit, a second circuit having receiving devices thereon, a switch comprising two members one of which is moved by the electric device in one direction, and means independent of the electric device to move it in the other direction, and means to hold the second member of said switch out of alinement with the first-mentioned switch member, when moving under the action of the electric device.

In testimony of which invention I have hereunto set my hand.

LEWIS G. ROWAND.

Witnesses:
FRANK S. BUSSER,
FRANCES ELLIS.